United States Patent [19]

Valentine et al.

[11] Patent Number: 5,012,113

[45] Date of Patent: Apr. 30, 1991

[54] INFRARED SYSTEM FOR MONITORING MOVEMENT OF OBJECTS

[75] Inventors: Kenneth H. Valentine, San Diego, Calif.; Diedre D. Falter; Kelly G. Falter, both of Knoxville, Tenn.

[73] Assignee: Martin Marietta Energy Systems, Inc., Oak Ridge, Tenn.

[21] Appl. No.: 345,069

[22] Filed: Apr. 28, 1989

[51] Int. Cl.⁵ ............................................. H04B 10/04
[52] U.S. Cl. .............................. 250/493.1; 250/504 R; 455/609; 372/38
[58] Field of Search ............ 250/493.1, 504 H, 504 R; 455/609; 372/38

[56] References Cited

U.S. PATENT DOCUMENTS

| | | | |
|---|---|---|---|
| 3,478,278 | 11/1969 | Muncheryan | 372/38 |
| 3,909,745 | 9/1975 | Dye | 372/38 |
| 4,866,285 | 9/1989 | Simms | 250/504 H |

OTHER PUBLICATIONS

Electro-Nuclear Laboratories, Inc., brochure, Nov. 1963.
G. M. Loper et al., "Detection & Monitoring of Honeybee Drone Congregation Areas by Radar," *Apidologie*, vol. 18(2), pp. 163–172 (1987).
D. Mascanzoni & H. Wallin, "The Harmonic Radar: A New Method of Tracing Insects in the Field," *Ecological Entomology*, vol. 11, pp. 387–390 (1986).
G. Abdian, "The Bees' Knees in Bar Code," ID Systems, vol. 8(8), pp. 20–26 (1988).

*Primary Examiner*—Jack I. Berman
*Attorney, Agent, or Firm*—James M. Spicer; Ivan L. Ericson

[57] ABSTRACT

A system for monitoring moving objects, such as the flight of honeybees and other insects, using a pulsed laser light source. This system has a self-powered micro-miniaturized transmitting unit powered, in the preferred embodiment, with an array solar cells. This transmitting unit is attached to the object to be monitored. These solar cells provide current to a storage energy capacitor to produce, for example, five volts for the operation of the transmitter. In the simplest embodiment, the voltage on the capacitor operates a pulse generator to provide a pulsed energizing signal to one or more very small laser diodes. The pulsed light is then received at a receiving base station using substantially standard means which converts the light to an electrical signal for processing in a microprocessor to create the information as to the movement of the object. In the case of a unit for monitoring honeybees and other insects, the transmitting unit weighs less than 50 mg, and has a size no larger than 1×3×5 millimeters. Also, the preferred embodiment provides for the coding of the light to uniquely identify the particular transmitting unit that is being monitored. A "wake-up" circuit is provided in the preferred embodiment whereby there is no transmission until the voltage on the capacitor has exceeded a pre-set threshold. Various other uses of the motion-detection system are described.

21 Claims, 3 Drawing Sheets

INFRARED SYSTEM FOR MONITORING MOVEMENT OF OBJECTS

This U.S. Government has rights in this invention pursuant to Contract Number DE-AC05-84OR21400 awarded by U.S. Department of Energy contract with Martin Marietta Energy Systems, Inc.

DESCRIPTION

1. Technical Field

This invention relates generally to systems for the detection of movement, and more particularly to a micro-miniaturized infrared system for monitoring the movement of objects where it is desirable to have a minimum weight and yet perform this monitoring at a substantial distance. A particular embodiment is directed toward the monitoring of honeybees, etc.

2. Background Art

There are a large number of applications for systems to detect movement of objects from a remote location. For example, where dangerous or "critical" materials are stored, it is desirable to detect unauthorized removal or tampering. In another application, certain systems are used to monitor prisoners within approved environments. Still another application for such a system is associated with hospital patients, e.g., burn victims, to monitor movement.

A major field where the detection of movement is of interest is in the field of insects, particularly the study of honeybees. Since their escape from a Brazilian laboratory in 1957, a species of bees identified as "Africanized bees" has been increasing in number and gradually spreading toward North America. This migration has been at a rate of more that 200 miles a year. These bees have mated actively with new queen bees of domestic European varieties to form undesirable Africanized hybrids. These "killer" bees produce far less honey and are much more nest-defensive than the European species. As a result, these killer bees have nearly destroyed commercial beekeeping operations throughout the territories they have occupied.

Although they have not yet migrated to the United States, the presence of the Africanized species is expected in the near future. In order to develop some form of deterrent to this ever increasing threat to the bee-keeping industry, additional information is needed about the habits of these Africanized species. For example, the paths of their flight, e.g., distance and height, will give some insight into their habits. Other information that will be of assistance is the determination of the frequency of mating of the queen, the matter of choosing of the drones, etc.

Currently there are rather crude methods for observing the flight paths of the bees. One is the visual observation by persons studying the flight; this requires the presence of a person to make this direct observation. This, of course, limits the observation to an area that can be seen by the observer. Another conventional method involves placing an identification number (or other code) on a selected number of captured bees and then releasing them to the environment. Bees are subsequently captured to determine if any of the coded bees are present. From this, an assumption must be made as to the flight paths of other of the bees and their actions between the tagging and the capture.

In a more scientific method of study, radar beams are used to follow the flight of swarms of bees. Due to the wavelength of the radar, this permits a study in a range of a few hundred meters at the most. Such systems are described, for example, in "Detection and Monitoring of Honeybee Drone Congregation Areas by Radar", *Apidologie*, Vol. 18(2), p. 163-172 (1987), and "The Harmonic Radar: A New Method of Tracing Insects in the Field", *Ecological Entomology*, Vol. 11, p. 387-390 (1986).

These prior systems are deficient in several aspects. The primary disadvantage is that an individual insect (e.g., the queen) cannot be monitored very effectively. Another disadvantage is the short range of the observations. Furthermore, the information is not really sufficient to determine the actions of the bees (or other insects, for that matter) on a continuous basis. Thus, they were not thought to be of significant value in the monitoring of the movement of the Africanized species of the honeybee to obtain the desired information.

Accordingly, it is an object of the present invention to provide a system that permits obtaining information about honeybees from significantly greater distances than is provided by the prior art.

It is another object of the present invention to provide a system for tracking individual insects from a greater distance than provided by the prior art.

Another object of the present invention is to provide a system where an infrared transmitting unit is attached to at least a given number of the honeybee species under investigation, with an infrared monitoring receiving station to obtain information as to the movement of those bees.

It is a further object to provide a sufficiently miniaturized infrared transmitting unit such that the weight thereof will not impede the normal flying of the honeybee.

Another object of the present invention is to provide an infrared transmitting unit for attachment to the honeybee, with this transmitting unit being self powered.

Also, it is an object of the present invention to provide a small, light weight infrared transmitting unit that can be used to monitor motion of a large number of objects.

Yet another object of this invention is to provide an infrared monitoring receiving station that is automatically and continuously aligned toward a moving infrared transmitting unit.

These and other objects of the present invention will become apparent upon a consideration of the drawings that follow, together with the detailed description thereof.

DISCLOSURE OF THE INVENTION

In accordance with the present invention, there is provided a very small infrared transmitting unit that can be attached to a honeybee (or other object). This device weighs less than 50 mg and is self powered, typically through the use of solar cells. The power source drives at least one infrared diode for transmitting a signal to a receiving station. Typically, the transmitted signal has a 2 microsecond duration which is repeated at least one hundred times every second. Preferably the transmitted signal contains coding such that the sending unit is uniquely identified. The transmitter has a line-of-sight range of 1-2 kilometers.

BEST MODE FOR CARRYING OUT THE INVENTION

Figure 1:
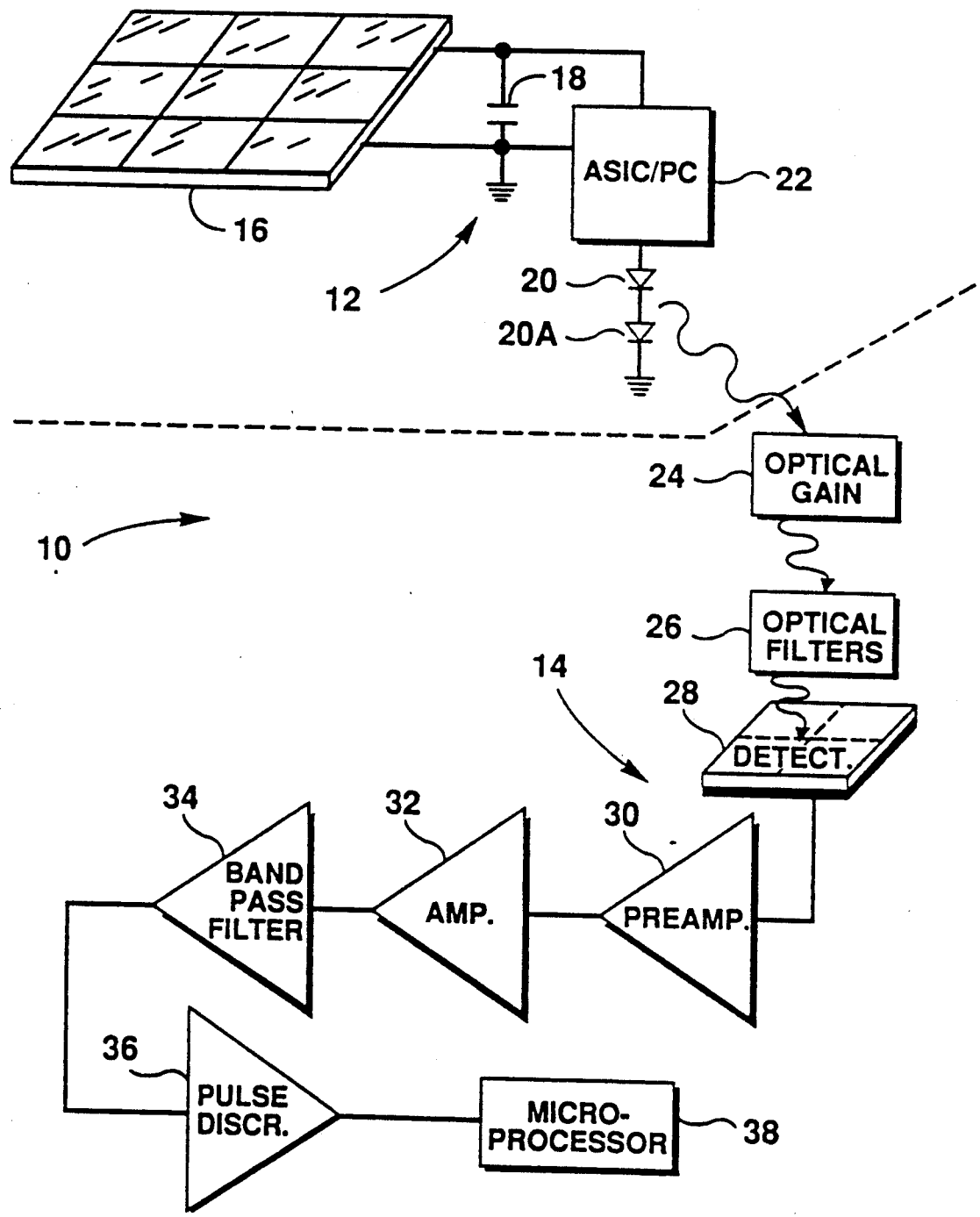
FIG. 1 is a simplified schematic diagram of the system of the present invention

A brief schematic diagram of a system for the monitoring of movement of objects is shown at 10 in FIG. 1. Although it has applications for many different objects, the principal application flight movements of honeybees. This system has a transmitting unit 12 for attachment to the honeybee and a base receiving unit 14. Power for the operation of the transmitting unit 12 is derived from a solar cell bank 16 which delivers a charge to an energy storage capacitor 18, as shown. The transmission of light from a laser diode 20 is controlled by an application specific integrated circuit/power control circuit (ASIC/PC) 22 drawing power from the storage capacitor. Although laser diodes have a lower efficiency than light emitting diodes (LED's), their narrow bandwidth results in higher signal-to-noise ratios after optical filtration. Increased light output efficiency is achieved by using a second laser diode 20A, as shown, connected in series with the first laser diode 20 so the same current flows through both diodes. This second diode is utilized in the preferred embodiment as discussed transmitting unit 12 are a part of, or attached to, a micro-circuit chip for a total weight of less than 50 mg. This micro-chip assembly is attached to the thorax of a honeybee of a selected species, such as a bee of the Africanized species. A further description of this transmitting unit is given below with regard to FIG. 2.

The laser light emitted from the diode 20 (and diode 20A if used) impinges at the base receiving station 14 upon an appropriate optical gain unit 24. This can be, for example, a telescope (see FIG. 4), a parabolic mirror, or other types of mirrors/lenses to enhance the light signal. This enhanced light signal is passed through appropriate optical filters 26 to eliminate most "solar noise", e.g. light other than that from the laser transmitter. Typically these filters are Fabry Perot narrow bandpass optical filters. This filtered light then impinges upon one or more silicon photocell PIN diodes 28 to produce an electrical signal proportional to the received laser light. Typically four photocells in a 2×2 array are used to receive the incoming light in four quadrants for purposes described hereinafter. Since this electrical signal is very small, a conventional preamplifier 30 and amplifier 32 are used to increase the signal strength. Further filtering is accomplished in a conventional band pass filter 34, with the output thereof inputted to a conventional pulse discriminator 36. The electrical components of the base receiving station 14 are as conventionally used for small signal processing, and the details of the components will be well known to those familiar with signal processing. The output from the discriminator 36 is applied to a conventional microprocessor unit 38 wherein selected information is computed using the laser light received from the transmitting unit 12. Typically this information will include elevation, bearing, range, etc.

Figure 2:
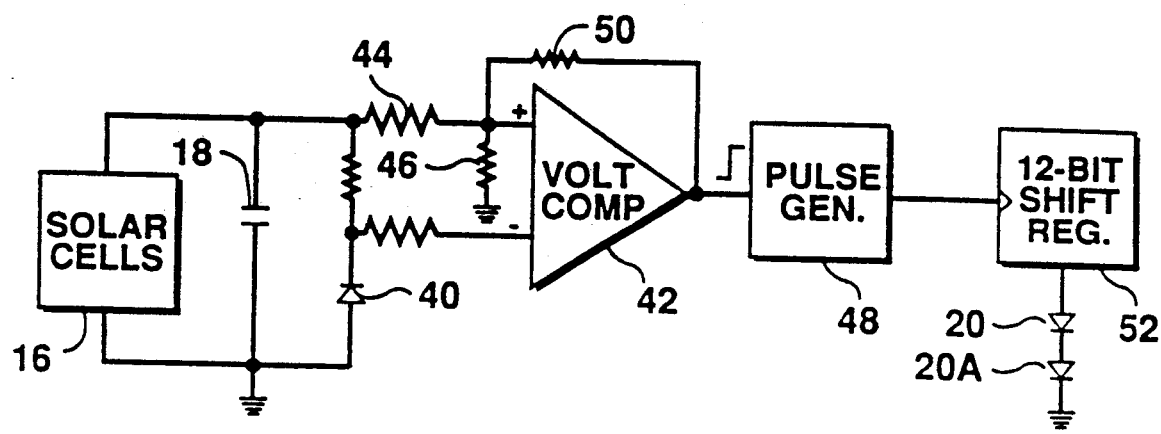
FIG. 2 is a block diagram illustrating the major components of the transmitting unit of the system of FIG. 1.
Figure 3:
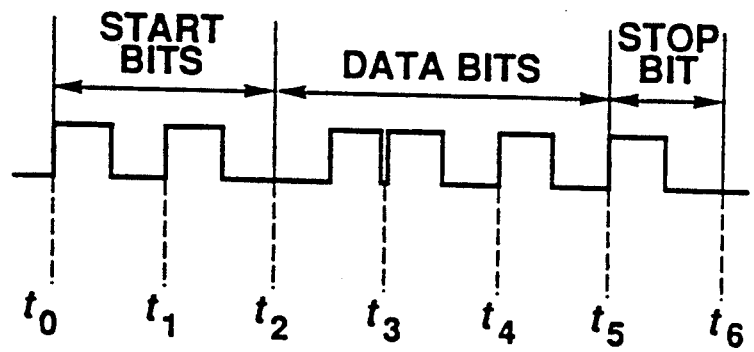
FIG. 3 is a wave form of the transmitted light from the transmitting unit of FIG. 2 when coding of the signal for identification purposes is desired.

A more detailed schematic diagram of the transmitting unit 12 is shown in FIG. 2. An array of six to ten 1 mm$^2$ solar cells 16 are connected in series and mounted on a silicon substrate (not shown). The output of the solar cells is connected to an energy storage capacitor chip 18, which is typically 0.1$\mu$F to 2.2$\mu$F, so as to produce a voltage (typically 5 volts) for the operation of the laser diode(s) 20. In order that the transmitting unit operate only when essentially full voltage has been generated on the iode 40 (which draws little current from the solar cell array) to set a switching threshold of a voltage comparator 42. Resistors 44, 46 are used as a voltage divider to divide the voltage on the energy capacitor 18. When the voltage across the capacitor increases to a point where the non-inverting input of the voltage comparator 42 surpasses the preset voltage level of the inverting input, the output of the comparator 42 switches on (or wakes up) to enable a pulse generator 48. The output of the comparator will remain "turned on" until the energy storage capacitor 18 has discharged to the lower preset threshold level as determined by the amount of hysteresis provided by a resistor 50. The pulse generator typically consists of a 10–100 KHz relaxation oscillator which, in turn, clocks a twelve bit shift register 52. Any desired coding of the shift register is fused into the registers prior to operation. This coding is illustrated in FIG. 3 described hereinafter. The shift register provides the current to the laser diodes 20, 20A. In applications where coding is not needed, this shift register can be eliminated and a simpler pulse generator can be used.

For this application of monitoring honeybees, the laser diode is typically an RCA MOdel C86000E which produces light with a wavelength of 800–900 nm. The choice of the wavelength of the laser light is critical for the application described. A higher quantum energy wavelength would require the use of more power to produce the same number of photons. Also, this selected wavelength falls within the most sensitive range of the silicon detectors. Further, this range of wavelength was chosen due to the decrease in spectral radiance of the sun in this region. Once the laser diode with a particular wavelength has been chosen, it is very essential to match the filter 26 to this wavelength. The laser diode has a bandwidth of approximately 3–4 nm, and the optical filters have a narrow window of approximately 12 nm. The pulse transmission frequency is based upon the charging time of the capacitor 18 which, in turn, depends on the intensity of the sun. Typically this frequency is between about 100 and 300 Hz.

A laser diode emits light in a cone of about thirty degrees. In order to increase the detection by the base receiving station, the preferred embodiment of the transmitting unit 12 will have a second laser diode 20A as referred to in connection with FIG. 1. Also, simple optics can be incorporated to disperse the emitted light into a larger solid angle. These two laser diodes are mounted on opposite sides of the aforementioned substrate in order that one light cone can be directed from either side of the bee.

As stated above, there are applications where it is preferable that the transmitted light carries a code and the circuit of FIG. 2 provides for this coding. This can be used, for example, to identify the specific source of the laser light, e.g., which one of several bees in a swarm is being identified by its code. The matter of coding can be understood by referring to the wave form illustrated in FIG. 3. The transmitted light typically would consist of a pair of "start bits". i.e., two pulses, that alert the receiving station that information transmission is beginning, and also determine a time interval that is repeated throughout the remainder of the coded signal. In the wave form in FIG. 3, there are three identification bits, meaning that up to eight transmitter units can be identified by their own unique three digit code number. Following this example of a three digit code, the three identification bits occur in the three time intervals that follow the start pulses. The location of each data bit in its own time interval determines whether it is a 0 or a 1 in the code. This will now be explained. If, for example, the bit is in the first half of its time interval that might be a 1. Correspondingly, if the bit is in the second half of its interval it would indicate a 0. Following this example, the code illustrated by the data bits in FIG. 3 is 011. Of course, more or less information bits can be coded into the signal. Preferably there also would be a "stop" bit to signal the receiving unit that the information of that particular signal is complete. This coding method assures that six pulses are beamed out each time a particular transmitting unit "fires". The sending of pulses containing both "zeros" and "ones" in this manner eliminates any concern over lost bits. As stated above, the infrared pulse transmitted by the laser diode has a typical duration of 2 microseconds. This pulse is typically repeated every 10,000 microseconds (on the average) to achieve the average 100 Hz baud rate.

Figure 4:
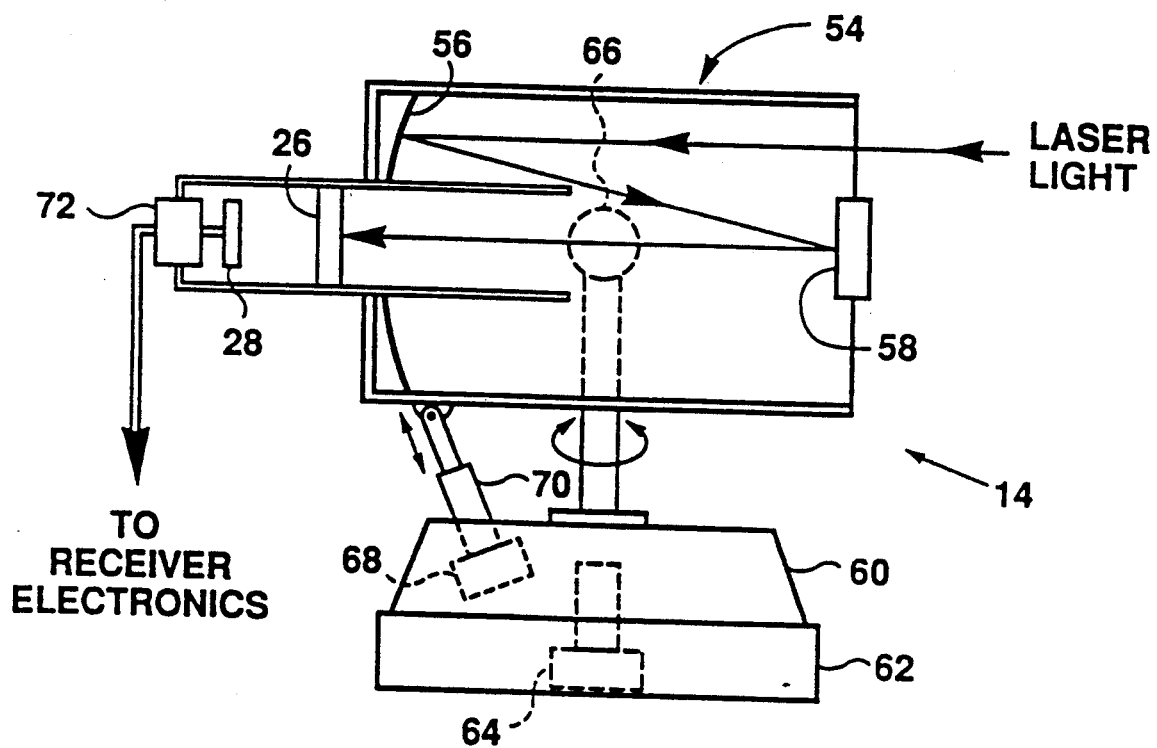
FIG. 4 is a drawing of the typical physical components of the receiving station of the system of FIG. 1.

Some of the physical components of the base receiving station 14 are illustrated in FIG. 4. The "optical gain" unit 24 of FIG. 1 typically consists of a telescope means 54 that collects the laser light and reflects the same with mirrors 56, 58 so as to impinge upon the quadrant detector 28 located at the focal plane of the telescope. The optical filter 26 of FIG. 1 would be incorporated in front of the detector 28. The telescope 54 is typically mounted on a base 60 that is rotatably mounted on a stationary base 62. The telescope 54 is arranged for both rotational and elevation movement. The rotational position example, a rotational stepping motor 64 mounted in the base 62 and arranged for turning the base 60. For elevation, the telescope 54 is mounted on a pivot 66 that is fixedly attached to the rotatable base 60. Elevation alignment of the telescope 54 is controlled with, for example, a linear stepping motor 68 and a strut 70 mounted in the movable base 60 and arranged for moving the telescope 54 about the pivot 66. The direction-controlling motors 64 and 68 have input from the aforementioned microprocessor 38 so that the telescope will automatically track the moving bees based on the amount of light received in each of the four quadrants of the detector 28. The motors 64 and 68 automatically and continuously redirect the telescope means 54 to maximize the signal strength being received from the transmitting unit 12. The telescope 54 may additionally incorporate a linear stepping motor 72 that is operated by the microprocessor 38 to provide automatic focusing of the detector 28.

The entire transmitting unit 12 is contained within a space of about 1×3×5 millimeters, and the total weight is less than 50 mg. This unit is glued to the honeybee with, for example, an alcohol and shellac mixture which is non-toxic to the insect. It is expected that transmission occurs during the daylight hours when there is sufficient sun to produce an adequate voltage on the energy capacitor 18. As stated, transmission is prevented by the voltage comparator 42 unless this minimum voltage is available. When sufficient voltage is available, the laser diode(s) 20 emit light in response to the pulse generator 48 and shift register 52. This light has a line-of-sight range of 1-2 km where it can be received by the base station 14. Through the use of coding to the transmitted light, the motion of an individual one of several moving honeybees can be monitored.

As stated above, the solar-cell-powered embodiment is useful in the presence of sufficient sun illumination. For applications of the invention when there will be insufficient light, as in certain medical applications, a very small lithium cell can be substituted. This lithium cell, together with the energy storage capacitor, will provide the necessary power to drive the transmitting circuit 12. In such applications, the "wake up" circuit may not be needed.

From the foregoing, it will be understood that a very light-weight but powerful laser beam transmitter has been developed that, together with a suitable receiving station, can detect movement. Of principal interest is the detection of movement of insects such as honeybees, with specific identification of selected ones of those bees. Because of the extremely light weight, the device will have other applications, such as in the medical field, security, inventory control, etc. Because a low power laser diode is used, the invention is non-detrimental to insects, humans and the environment.

Only certain embodiments of the present invention have been described in detail. This is not to limit the invention, however, and the invention is to be limited only by the appended claims attached hereto, or their equivalents, when read together with the detailed description of the invention.

We claim:

1. An infrared transmitter, which comprises:
   a source of direct current;
   an energy storage capacitor connected to said source for producing a voltage to power said transmitter;
   a voltage-controlled switch means connected to said capacitor for operation by said voltage; and
   an infrared emitter connected to said switch means for receiving power therefrom whereby infrared light is produced from said emitter when said switch means is switched to an on state.

2. The transmitter of claim 1 wherein said source of direct current is an array of solar cells.

3. The transmitter of claim 1 wherein said infrared light is of a wavelength in the range of about 800 to 900 nanometers.

4. The transmitter of claim 1 further comprising means for introducing a coding into said infrared light whereby said transmitter is uniquely identified by said coding in said infrared light.

5. The transmitter of claim 1 wherein said voltage-controlled switch means includes a diode connected to said source of direct current and a voltage comparator connected between said diode and said infrared emitter, whereby said diode establishes a threshold voltage for said voltage comparator and said voltage comparator provides said on state during discharge of said capacitor.

6. The transmitter of claim 5 wherein said voltage-controlled switch means further includes a voltage divider connected between said capacitor and said voltage comparator for dividing said voltage on said capacitor.

7. The transmitter of claim 1 wherein said source of direct current is a battery.

8. The transmitter of claim 1 wherein said infrared emitter is at least one laser diode.

9. The transmitter of claim 1 wherein said infrared emitter is two series-connected laser diodes.

10. The transmitter of claim 1 wherein said infrared emitter is at least one light emitting diode.

11. A self-powered infrared transmitter, which comprises:
a source of direct current;
an energy storage capacitor connected to said source for producing a voltage to power said transmitter;
a switch means connected to said capacitor for receiving said voltage therefrom, said switch means operating from said voltage to produce an on and off switched states output;
a pulse generator connected to said switch means, said pulse generator producing clocking pulses when said switch states output is on;
a multi-bit shift register connected to said pulse generator for clocking therefrom, said shift register producing a series of coded pulses from said clocking pulses when said switched states output is switched on; and
two series-connected infrared emitters connected to said shift register for receiving said coded pulses therefrom, said emitters producing radiating infrared light corresponding to said coded pulses.

12. The transmitter of claim 11 wherein said source of direct current is a battery.

13. The transmitter of claim 11 wherein said source of direct current is an array of solar cells.

14. The transmitter of claim 11 wherein said source of direct current is a lithium cell.

15. An infrared transmitter, which comprises:
a source of direct current;
an energy storage capacitor connected to said source for producing a voltage to power said transmitter;
a voltage-controlled switch means connected to said capacitor for operation by said voltage; and
a pulse generator connected to said switch means for producing an output when said switch means is switched to an on state; and
an infrared emitter connected to said pulse generator for receiving power therefrom whereby infrared light is produced by said emitter from said output of said pulse generator.

16. The transmitter of claim 15 wherein said pulse generator is an oscillator.

17. An infrared transmitter, which comprises:
a source of direct current;
an energy storage capacitor connected to said source for producing a voltage to power said transmitter;
a voltage-controlled switch means connected to said capacitor for operation by said voltage;
a pulse generator connected to said switch means for producing a series of clocking pulses when said switch means is switched to an on state;
a multi-bit shift register connected to said pulse generator for clocking thereby, said shift register producing a series of coded pulses when clocked by said clocking pulses; and
an infrared emitter connected to said shift register for receiving power therefrom whereby said emitter produces a series of infrared light pulses containing said coding.

18. The transmitter of claim 17 wherein said coded pulses from said shift register includes two start bits and a plurality of data bits, each of said bits occurring within one of a sequence of evenly-spaced time intervals, the binary value of each of said data bits being determined by its location at either the beginning or the end of its own time interval.

19. The transmitter of claim 17 wherein pulses of said infrared light have a duration of about two microseconds, and are repeated at least 10 times per second.

20. An infrared transmitter, which comprises:
a source of direct current;
an energy storage capacitor connected to said source for producing a voltage to power said transmitter;
a voltage-controlled switch means connected to said capacitor for operation by said voltage;
a shift register connected to said switch means for producing a series of coded pulses when said switching means is switched to an on state; and
an infrared emitter connected to said shift register for receiving power therefrom whereby said emitter produces a series of coded infrared light pulses from said coded pulses.

21. A micro-miniaturized and self-powered infrared transmitter for attachment to objects, which comprises:
a source of direct current;
an energy storage capacitor connected to said source for producing an electrical charge;
a switch means connected to said capacitor for receiving a voltage therefrom, said switch means operating from said voltage to produce an on and off switched states output;
a relaxation oscillator connected to said switch means, said relaxation oscillator producing clocking pulses when said switched states output is on;
a multi-bit shift register connected to said relaxation oscillator for clocking therefrom, said shift register producing a series of coded pulses from said clocking pulses when said switched states output is on; and
two series-connected laser diodes connected to said shift register for receiving said coded pulses therefrom, said diodes producing radiating infrared light with a wavelength of about 800–900 nm, said infrared light corresponding to said coded pulses.

* * * * *